United States Patent
Filsfils et al.

(10) Patent No.: US 7,505,402 B2
(45) Date of Patent: Mar. 17, 2009

(54) METHOD AND APPARATUS FOR PROVIDING FASTER CONVERGENCE FOR REDUNDANT SITES

(75) Inventors: Clarence A. M. Filsfils, Brussels (BE); James N. Guichard, Groton, MA (US); Robert Raszuk, Komorow (PL); Jean-Philippe Vasseur, Dunstable (FR); Kris Michielsen, Keerbergen (BE); Peter De Vriendt, Denderleeuw (BE)

(73) Assignee: Cisco Technology, Inc., San Jose, CA (US)

( * ) Notice: Subject to any disclaimer, the term of this patent is extended or adjusted under 35 U.S.C. 154(b) by 672 days.

(21) Appl. No.: 11/159,719

(22) Filed: Jun. 23, 2005

(65) Prior Publication Data
US 2007/0008878 A1    Jan. 11, 2007

(51) Int. Cl.
G06F 11/00 (2006.01)
G01R 31/08 (2006.01)
H04L 12/56 (2006.01)

(52) U.S. Cl. .................. 370/217; 370/221; 370/397
(58) Field of Classification Search ......... 370/216–221, 370/237–238, 464–465; 709/238
See application file for complete search history.

(56) References Cited

U.S. PATENT DOCUMENTS

| | | | |
|---|---|---|---|
| 6,662,308 B1 * | 12/2003 | Baroni et al. | 714/4 |
| 6,683,865 B1 * | 1/2004 | Garcia-Luna-Aceves et al. | 370/349 |
| 6,895,441 B1 * | 5/2005 | Shabtay et al. | 709/238 |
| 7,289,428 B2 * | 10/2007 | Chow et al. | 370/216 |
| 7,345,991 B1 * | 3/2008 | Shabtay et al. | 370/221 |
| 2002/0186654 A1 * | 12/2002 | Tornar | 370/225 |
| 2003/0031124 A1 | 2/2003 | Chow et al. | |
| 2004/0001485 A1 * | 1/2004 | Frick et al. | 370/389 |
| 2004/0037275 A1 * | 2/2004 | Li et al. | 370/370 |
| 2005/0160481 A1 * | 7/2005 | Todd et al. | 726/30 |
| 2006/0002289 A1 * | 1/2006 | Menon et al. | 370/216 |
| 2006/0126495 A1 * | 6/2006 | Guichard et al. | 370/216 |
| 2006/0126496 A1 * | 6/2006 | Filsfils et al. | 370/216 |

OTHER PUBLICATIONS

International Application No. PCT/US06/24632, filed Jun. 23, 2006, International Search Report, dated Jul. 7, 2008.

\* cited by examiner

*Primary Examiner*—Chi H Pham
*Assistant Examiner*—Warner Wong
(74) *Attorney, Agent, or Firm*—Brinks Hofer Gilson & Lione

(57) ABSTRACT

A method, apparatus and computer program product for providing convergence for a dual-homed site in a network is presented. An occurrence of a failure between a first Provider Edge (PE) device and a first Customer Edge (CE) device in communication with a dual-homed site is detected. A determination is made whether an alternate route exists for the dual-homed site in a routing table associated with the first PE device. When an alternate route exists then a routing entry associated with the first CE device in a routing table of said first PE device is kept from being deleted for a predetermined amount of time, the routing table is modified to reference the alternate route, the routing entry is rewritten to perform a POP and lookup in a VRF table of the first PE device, and the routing entry is deleted after the predetermined amount of time has elapsed.

18 Claims, 5 Drawing Sheets

METHOD AND APPARATUS FOR PROVIDING FASTER CONVERGENCE FOR REDUNDANT SITES

BACKGROUND

Computer networks have become ubiquitous. Computer networks include the Internet, Service Provider (SP) networks, private networks, and Local Area Networks (LANs). A network such as an SP network may include peripherally located Provider Edge (PE) routers, each of which couples to one or multiple Customer Edge (CE) routers. The PE routers are used to maintain routing and forwarding context for each customer. The CE routers may couple to private LANs associated with one or multiple customers. The private LANs are also referred to as core networks. The CE site can be a MAN or WAN as well. The PE routers learn local customer routes from the CE routers and distribute remote customer routes to the CE router. The PEs use Border Gateway Protocol (BGP) to distribute customer routes to each other. To support operation, the PE routers typically maintain Virtual Routing and Forwarding (VRF) information in a table (a VRF table) dictating how to route and forward traffic through the shared physical network to support corresponding Virtual Private Networks (VPNs) for the different customers. For the core network, an ingress PE uses BGP functions to determine the egress PE. For example, the ingress PE puts the packet in a two-level Multi Protocol Label Switching (MPLS) stack. The top label is used to tunnel packets to the egress PE to accomplish MPLS forwarding through the core network. The bottom label is used by the egress PE to identify either the outgoing FIB rewrite adjacency or VRF table for another lookup. Alternately, an IP VPN may be used wherein PE to PE data is encapsulated in an IP header (e.g., IP, GRE, and L2TPv3)

VPNs provide a secured means for transmitting and receiving data between network nodes even though a corresponding physical network supporting propagation of the data is shared by many users. Typically, the data transmitted between such network nodes (e.g., edge nodes of a service provider network) is encrypted to protect against eavesdropping and tampering by unauthorized parties. According to one conventional technique, an SP network may extend beyond PE nodes to CE nodes.

Certain sites on a network may include redundant PE to CE connections. Sites provided in this manner are referred to as dual-homed sites. In this scenario, one of the PE to CE connections is designated as the preferred path and is the primary path used for communication between the PE, CE and the dual-homed site. The redundant path may be used in certain situations.

In the event of a failure of a device or link that is part of a network, network packets are dropped. In order to overcome this, various techniques are used to determine the location of the failure and to adapt the network to work around the failure. For example, after a failure is detected, the LFIB tables of the various routers may need to be modified to point to corresponding VRFs for lookup and switch back to an alternative PE. This working around the failed device or link is referred to as convergence.

SUMMARY

Conventional mechanisms such as those explained above suffer from a variety of deficiencies. One such deficiency is that in conventional networks, when a device or link fails, a number of packets are dropped. This packet dropping takes place until convergence finishes, wherein the routers have had their routing and forwarding tables modified to route around the failing device or link such that packets are no longer dropped.

Embodiments of the invention significantly overcome such deficiencies and provide mechanisms and techniques that provide a method for speeding up convergence for redundant sites. RFC2547 convergence for redundant sites is used wherein the PE locally connected to the failed link serves as an intermediate hop along the next bestpath during the amount of time it takes for the remote PE's to update their routing table in response to the failure of a device or link.

In a particular embodiment, a method for providing convergence for a dual-homed site in a network includes detecting an occurrence of failure between a first PE device and a first CE device in communication with the dual-homed site. Once a failure is detected, a determination is made whether an alternate route exists for the dual-homed site in a routing table associated with the first PE. When an alternate route exists then a routing entry associated with the first CE device in a routing table of first PE device is kept from being deleted for a predetermined amount of time. Alternately, the presence of an alternate route is not determined, and if an alternate route is there, It will be switched, otherwise it will be dropped. Next, the routing entry is rewritten to perform a POP and a lookup in a routing table of the first PE device. The routing entry is then deleted after the predetermined amount of time has elapsed.

Other embodiments include a computer readable medium having computer readable code thereon for providing convergence for a dual-homed site in a network. The medium includes instructions for detecting a failure between a first PE device and a first CE device in communication with the dual-homed site. The medium further includes instructions for determining whether an alternate route exists for the dual-homed site in a routing table associated with the first PE. The medium additionally includes instructions such that when an alternate route exists then a routing entry associated with the first CE device in a routing table of the first PE router is kept from being deleted for a predetermined amount of time after the detecting a failure. Alternately, the presence of an alternate route is not determined, and if an alternate route is there, it will be switched, otherwise it will be dropped. The medium further includes instructions such that the routing entry is rewritten to perform a POP and lookup in a routing table of the first PE router, and the routing entry is deleted after the predetermined amount of time has elapsed.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method for speeding up convergence for a network including a redundant site as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method for speeding up convergence for redundant sites as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
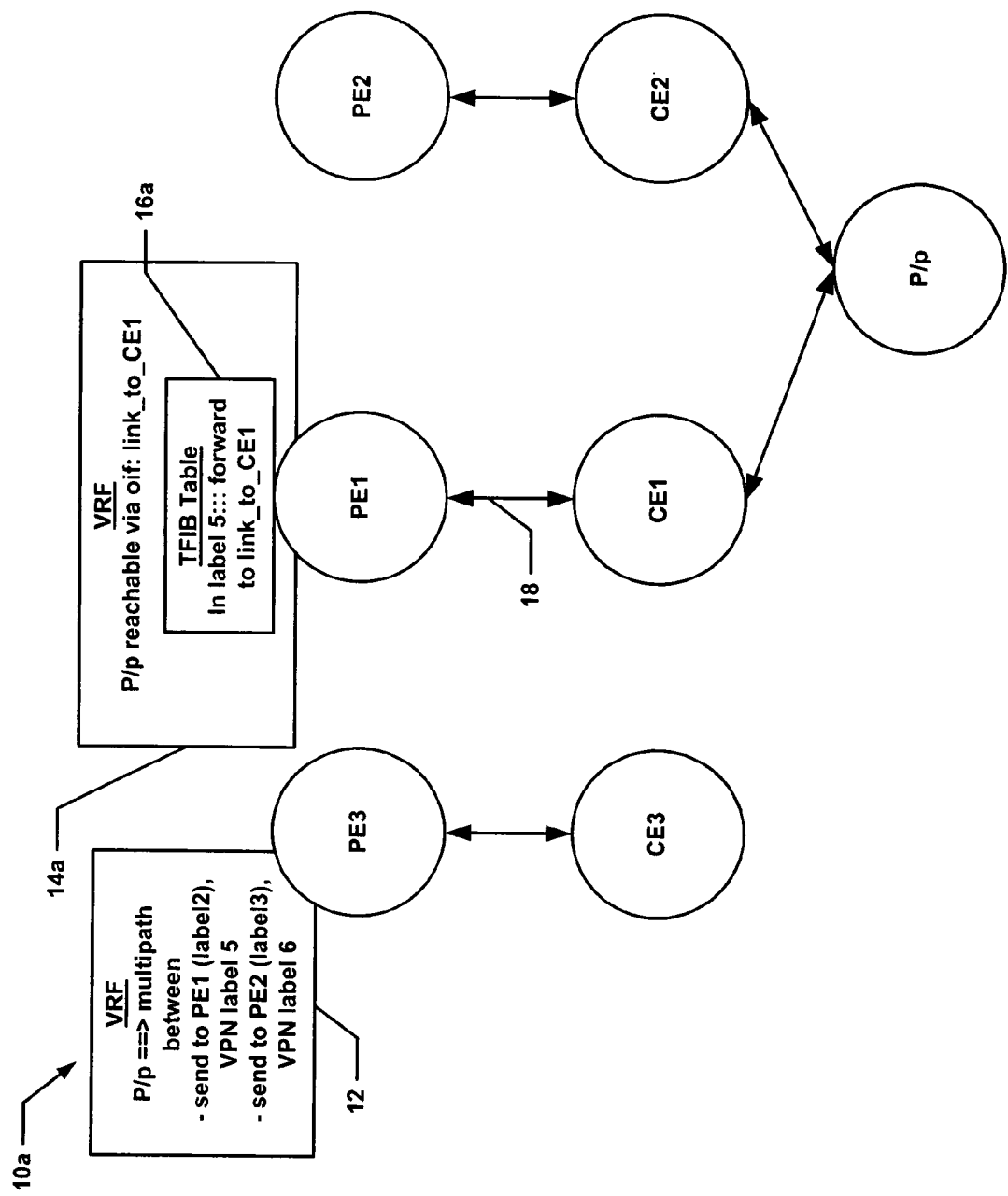
FIG. 1 illustrates an example network topology showing a network including a dual-homed site.

Referring now to FIG. 1, a particular embodiment of a network topology is shown prior to the occurrence of a failure in the network 10*a*. In this network 10*a*, a first PE router PE1 is shown coupled to a first CE router CE1 via link 18. The CE1 router is couple to a dual-homed site P/p. Also coupled to the dual-homed site P/p is a second CE router CE2 which is in communication with a second PE router PE 2. Also shown are a third PE router PE3 which is in communication with a third CE Router CE3. PE1, PE2 and PE3 are all part of a service provider network.

PE 3 includes a VRF table 12 which recognizes the dual-homed site P/p. The VRF table 12 establishes multiple paths to the dual-homed site P/p. A first path is via PE1 (label 2) through VPN label 5, and a second path is via PE2 (label 3) by way of VPN label 6. Traffic received at PE3 (e.g. packets from CE3) and destined for P/p are routed by either of the two entries in VRF table 12, that is across VPn5 by way of PE1 or across VPN6 by way of PE2. Typically, one path is designated as a "best path" and is used as the primary path.

PE1 has a VRF table 14*a* which includes an entry for the dual-homed site shown as "P/p reachable oif: link_to_CE1". PE1 also has a table which shows the dual-homed site available via the link to CE1. PE1 further includes a Tag Forwarding Information Base (TFIB) table 22*a* which includes an entry "in label 5:::forward to link_to_CE1". In this scenario, traffic can be directed to dual-homed site P/p either via a path including PE1 and CE1 or via a path comprising PE2 and CE2.

In the event of a failure, for example if CE1 should fail, packets from PE1 destined to CE1 would be dropped until PE1's routing table was updated through convergence of the network such that packets destined for dual-homed site P/p would be routed strictly through PE2 and CE2. The time it takes for this convergence (e.g., updating of the tables once the failed link or device is detected) to take place results in a number of packets being dropped.

Figure 2:
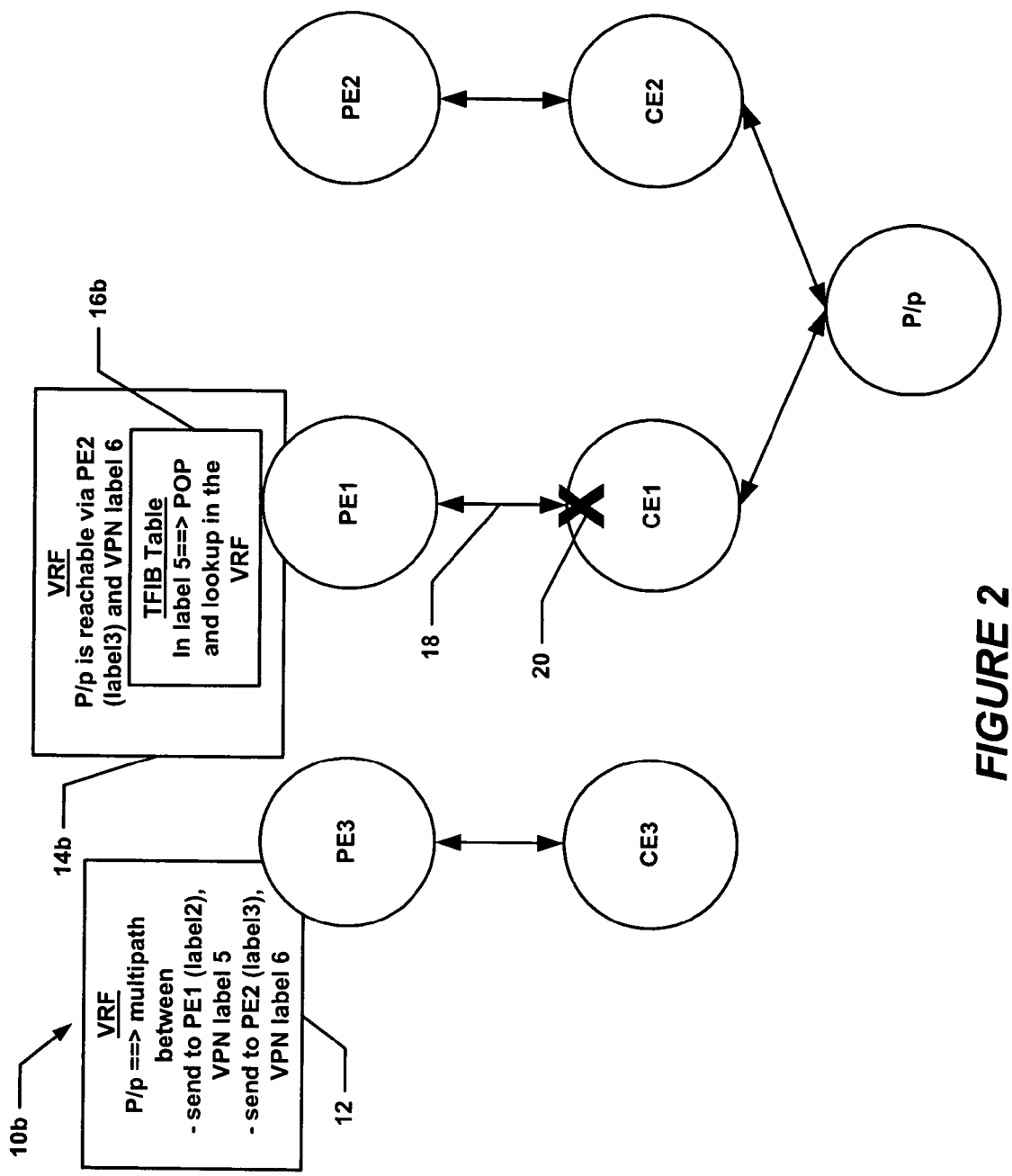
FIG. 2 illustrates an example network topology showing a network having a dual-homed site experiencing a device or link failure.

Referring now to FIG. 2 a network environment 10*b* similar to that of FIG. 1 is shown, however a failure has occurred as shown by indicator 20. The failure could be, for example, the link 18 between PE1 and CE1 or could be CE1 itself. In accordance with embodiments of the present invention, instead of having packets at PE1 destined for dual-homed site P/p be dropped until convergence completes, the following actions take place.

Once the failure is detected between PE1 and CE1, a determination is made whether an alternate route exists in the routing table of PE1 for the dual-homed site P/p. When an alternate route does not exist, then conventional processing takes place. Alternately, the presence of an alternate route is not determined, and if an alternate route is there, it will be switched, otherwise it will be dropped. When an alternate does exist, a routing entry associated with the CE1 router in the routing table of the PE1 router is kept from being deleted for a predetermined period of time. The routing table is then modified to reference the alternate route. For example, PE1 modifies its VRF from "P/p is reachable via oif: link_to_CE1" to "P/p is reachable via PE2 (label3) and VPN label 6".

Next a routing entry associated with the failed device or link is rewritten to perform a POP and a lookup in the VRF table of PE1. PE1 modifies the oif/rewrite of the TFIB entry "In label 5" from "In Label 5 ::: forward to link_to_CE1" to "In label 5 ::: POP and lookup in the VRF". PE1 flags this TFIB entry "In label 5=> . . . " for garbage collection in 60 seconds, and 60 seconds later, the TFIB entry is deleted.

Accordingly, packets received at PE1 that are destined for P/p will be directed to P/p by way of the PE2 (label 3) VPN6 route, resulting in very few dropped packets. After a predetermined amount of time has elapsed, (preferably longer that the time required for convergence to complete) the routing entry that was rewritten is deleted.

Accordingly, by way of the present invention, upon local link failure, the PE connected to the failed link serves as an intermediate step towards the next best exit point instead of dropping the traffic sent to the previously advertised label. This is achieved by keeping this previous label for a limited amount of time (e.g. 60 seconds) and programming that label entry to cause a POP and VRF lookup instead of a transmission on the (now) down link. In such a manner the number of dropped packets is greatly reduced thereby providing improved reliability and performance of the network as a whole.

Figure 3A:
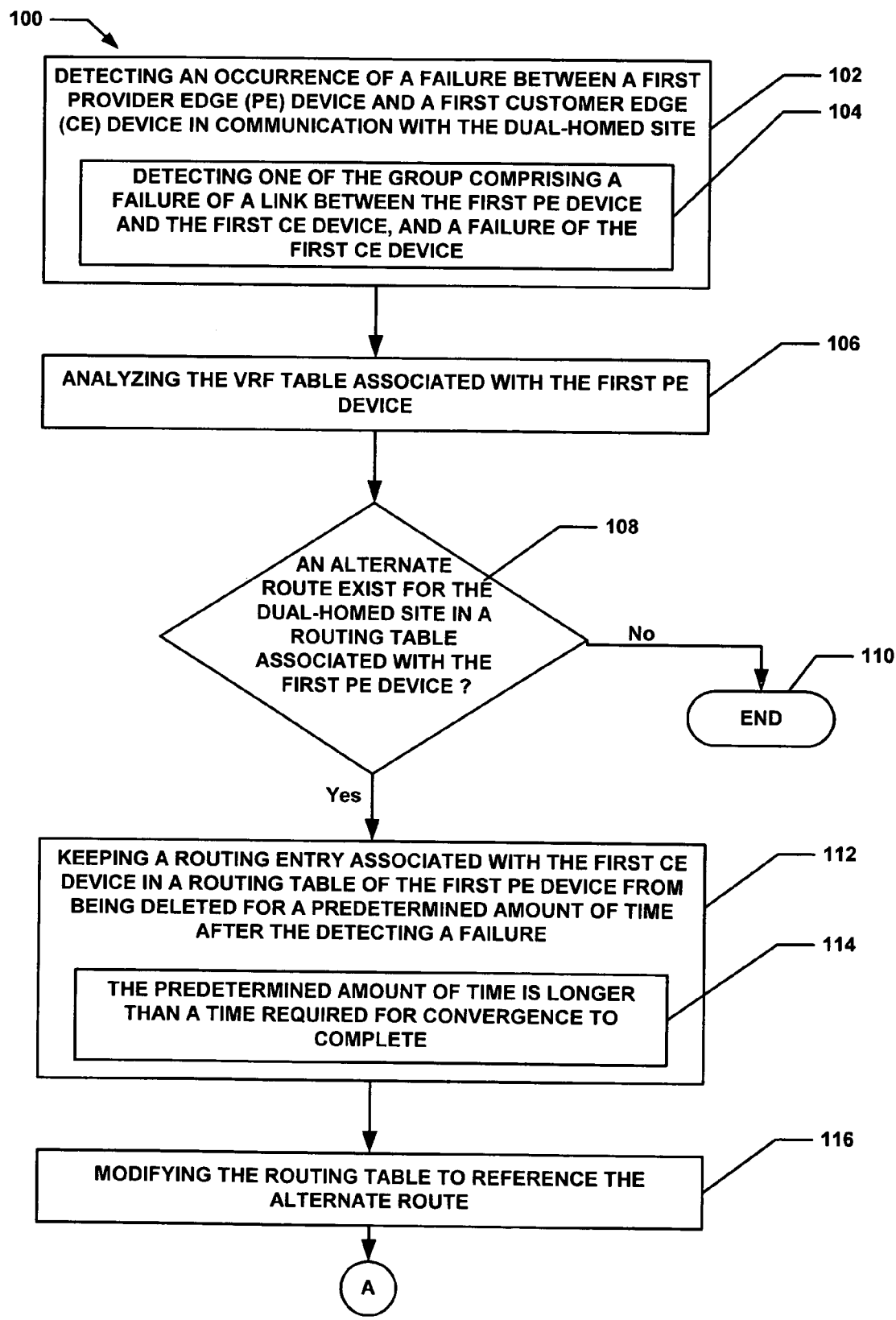
FIGS. 3A and 3B illustrate a flowchart for a particular embodiment of a method of speeding up convergence for a network including a dual-homed site in accordance with embodiments of the invention.
Figure 3B:
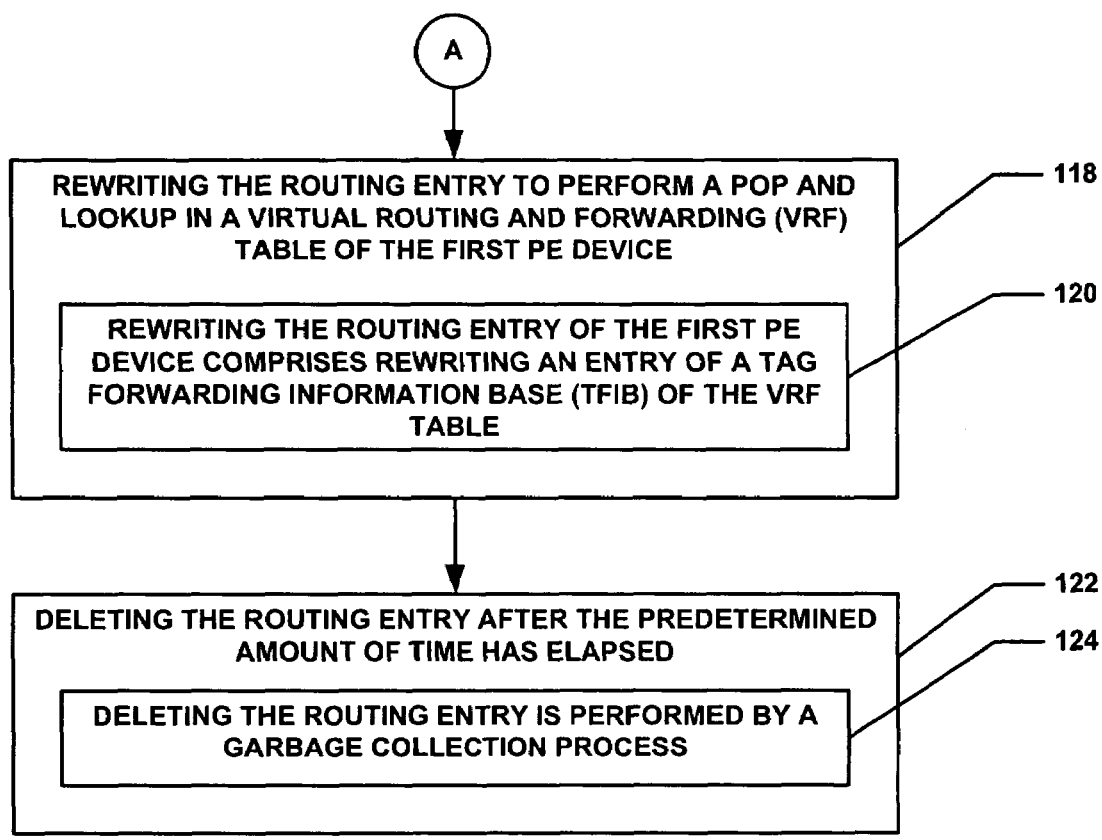

A flow chart of a particular embodiment of the presently disclosed method is depicted in FIGS. 3A and 3B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 3A and 3B, an embodiment of a method 100 of providing convergence for a dual-homed site in a network is shown. The method 100 begins with processing block 102 wherein an occurrence of a failure between a first Provider Edge (PE) device and a first Customer Edge (CE) device in communication with the dual-homed site is detected. As shown in processing block 104, the failure could be a failure of a link between the first PE device and the first CE device, or a failure of the first CE device.

As shown in decision block 106, the VRF table associated with the first PE device is analyzed. Next, in decision block 108, a determination is made whether an alternate route exists for the dual-homed site in the routing table associated with the first PE device. When the determination is that an alternate route for the dual-homed device does not exist in the routing table of the first PE device, the process terminates, as indicated at termination block 110. When the determination at decision block 106 is that an alternate route for the dual-homed device does exist in the routing table of the first PE device, then processing continues at processing blocks 112 et. seq.

In processing block 112, a routing entry associated with the first CE device in a routing table of the first PE device is kept from being deleted for a predetermined amount of time after the detection of a failure. As shown in processing block 114, the predetermined amount of time is longer than a time required for convergence to complete. This prevents the convergence process from overwriting the routing entry for the dual-homed site.

In processing block 116, the routing table is modified to reference the alternate route. As shown in processing block 118, a routing entry is rewritten to perform a POP and to perform a lookup in a Virtual Routing and Forwarding (VRF) table of the first PE device. In this particular embodiment, and as shown in processing block 120, rewriting the routing entry of the first PE device comprises rewriting an entry of a Tag Forwarding Information Base (TFIB) of the VRF table.

In processing block 122, the routing entry is deleted after the predetermined amount of time has elapsed. As depicted in processing block 124, deleting the routing entry is performed by a garbage collection process.

Figure 4:
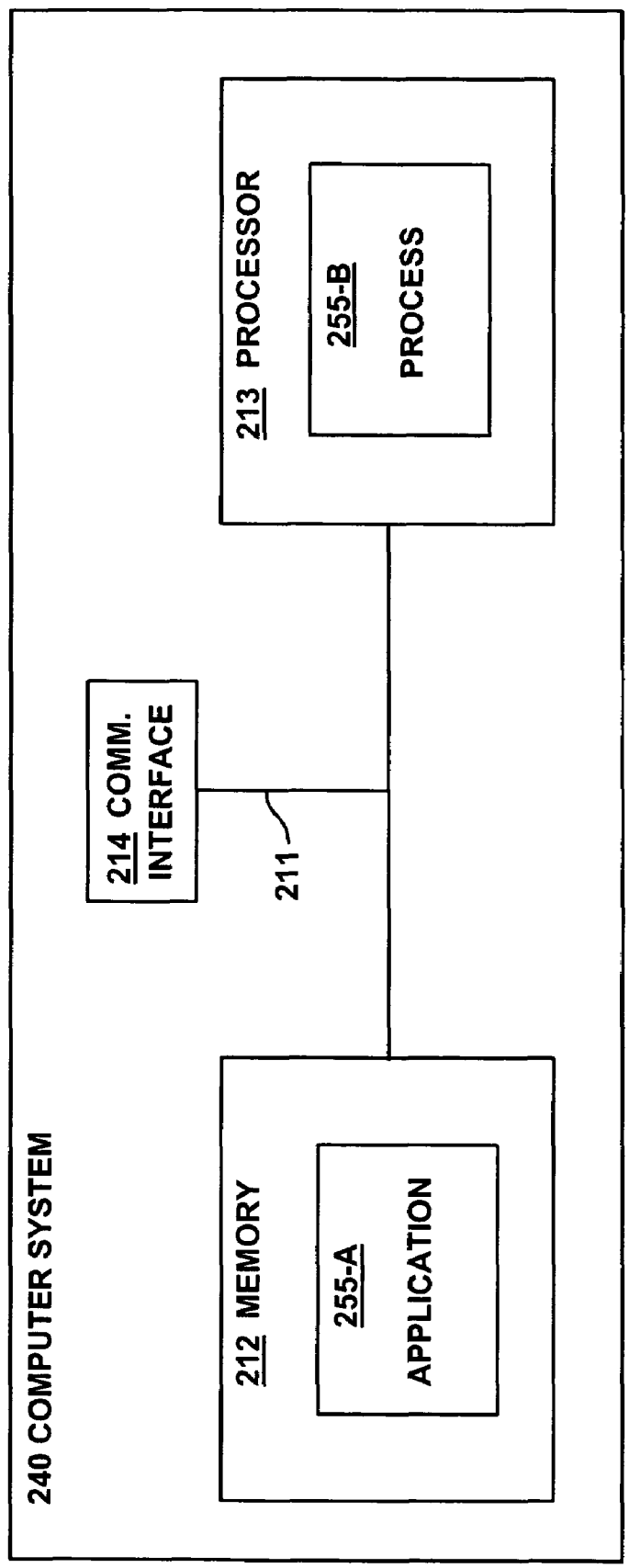
FIG. 4 illustrates an example computer system architecture for a computer system that performs faster convergence for a network including a dual-homed site in accordance with embodiments of the invention.

Referring now to FIG. 4, an example architecture of a computer system that is configured as a host computer system 240 is shown. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

What is claimed is:

1. A method of providing convergence for a dual-homed site in a network, the method comprising:

detecting an occurrence of a failure between a first Provider Edge (PE) device and a first Customer Edge (CE) device in communication with said dual-homed site; and determining whether an alternate route exists for said dual-homed site in a routing table associated with said first PE device, and when an alternate route exists then:

keeping a routing entry associated with said first CE device in a routing table of said first PE device from being deleted for a predetermined amount of time after said detecting a failure wherein said predetermined amount of time is longer than a time required for the convergence to complete;

modifying said routing table to reference said alternate route;

rewriting the routing entry to perform a popping and lookup in a Virtual Routing and Forwarding (VRF) table of said first PE device; and deleting said routing entry after said predetermined amount of time has elapsed.

2. The method of claim 1 wherein said detecting a failure comprises detecting one of the group comprising a failure of a link between said first PE device and said first CE device, and a failure of said first CE device.

3. The method of claim 1 wherein said determining is performed by analyzing the VRF table associated with said first PE device.

4. The method of claim 1 wherein said deleting said routing entry is performed by a garbage collection process.

5. The method of claim 1 wherein said rewriting the routing entry of said first PE device comprises rewriting an entry of a Tag Forwarding Information Base (TFIB) of said VRF table.

6. A computer readable medium having computer readable code thereon for providing convergence for redundant sites in a network, the medium comprising instructions for:

detecting an occurrence of a failure between a first Provider Edge (PE) device and a first Customer Edge (CE) device in communication with said dual-homed site; and determining whether an alternate route exists for said dual-homed site in a routing table associated with said first PE device and when an alternate route exists then:

keeping a routing entry associated with said first CE device in a routing table of said first PE device from being deleted for a predetermined amount of time after said detecting a failure wherein said predetermined amount of time is longer than a time required for the convergence to complete;

modifying said routing table to reference said alternate route;

rewriting the routing entry to perform a popping and lookup in a Virtual Routing and Forwarding (VRF) table of said first PE device; and deleting said routing entry after said predetermined amount of time has elapsed.

7. The computer readable medium of claim 6 wherein said instructions for detecting a failure comprises instructions for detecting one of the group comprising a failure of a link between said first PE device and said first CE device, and a failure of said first CE device.

8. The computer readable medium of claim 6 wherein said determining is performed by analyzing the VRF table associated with said first PE device.

9. The computer readable medium of claim 6 wherein said deleting said routing entry is performed by a garbage collection process.

10. The computer readable medium of claim 6 wherein said instructions for rewriting the routing entry of said first PE device comprises instructions for rewriting an entry of a Tag Forwarding Information Base (TFIB) of said VRF table.

11. A computer system comprising:

a memory;

a processor;

a communications interface;

an interconnection mechanism coupling the memory, the processor and the communications interface; and wherein the memory is encoded with an application providing convergence for redundant sites in a network, that when performed on the processor, provides a process for processing information, the process causing the computer system to perform the operations of:

detecting an occurrence of a failure between a first Provider Edge (PE) device and a first Customer Edge (CE) device in communication with said dual-homed site; and determining whether an alternate route exists for said dual-homed site in a routing table associated with said first PE device and when an alternate route exists then:

keeping a routing entry associated with said first CE device in a routing table of said first PE device from being deleted for a predetermined amount of time after said detecting a failure wherein said predetermined amount of time is longer than a time required for the convergence to complete;

modifying said routing table to reference said alternate route;

rewriting the routing entry to perform a popping and lookup in a Virtual Routing and Forwarding (VRF) table of said first PE device; and deleting said routing entry after said predetermined amount of time has elapsed.

12. The computer system of claim 11 wherein said detecting a failure comprises detecting one of the group comprising a failure of a link between said first PE device and said first CE device, and a failure of said first CE device.

13. The computer system of claim 11 wherein said determining is performed by analyzing the VRF table associated with said first PE device.

14. The computer system of claim 11 wherein said deleting said routing entry is performed by a garbage collection process.

15. The computer system of claim 11 wherein said rewriting the routing entry of said first PE device comprises rewriting an entry of a Tag Forwarding Information Base (TFIB) of said VRF table.

16. The method of claim 1 wherein said keeping a routing entry further comprises preventing a convergence process from overwriting the routing entry for said dual-homed site.

17. The computer readable medium of claim 6 wherein said instructions for keeping a routing entry further comprises instructions for preventing a convergence process from overwriting the routing entry for said dual-homed site.

18. The computer system of claim 11 wherein said keeping a routing entry further comprises preventing a convergence process from overwriting the routing entry for said dual-homed site.

* * * * *